US012139943B2

(12) United States Patent
Magnotta et al.

(10) Patent No.: US 12,139,943 B2

(45) Date of Patent: Nov. 12, 2024

(54) HANDS FREE BATHROOM STALL LATCH

(71) Applicant: MATEC Property Group, LLC, Derwood, MD (US)

(72) Inventors: Mark Magnotta, Severna Park, MD (US); Jeffrey Rankin, Derwood, MD (US)

(73) Assignee: MATEC PROPERTY GROUP, LLC, Derwood, MD (US)

( * ) Notice: Subject to any disclaimer, the term of this patent is extended or adjusted under 35 U.S.C. 154(b) by 0 days.

(21) Appl. No.: 17/479,347

(22) Filed: Sep. 20, 2021

(65) Prior Publication Data

US 2022/0178180 A1 Jun. 9, 2022

Related U.S. Application Data

(60) Provisional application No. 63/121,065, filed on Dec. 3, 2020.

(51) Int. Cl.

| | |
|---|---|
| ***E05C 1/10*** | (2006.01) |
| ***E05B 1/00*** | (2006.01) |
| ***E05C 1/00*** | (2006.01) |

(52) U.S. Cl.

CPC .............. *E05C 1/10* (2013.01); *E05B 1/0046* (2013.01); *E05B 1/0069* (2013.01); *E05C 1/004* (2013.01)

(58) Field of Classification Search

CPC ........... Y10T 292/096; Y10T 292/1022; Y10T 292/1023; Y10T 292/1024; E05C 1/10;

(Continued)

(56) References Cited

U.S. PATENT DOCUMENTS

| | | | | |
|---|---|---|---|---|
| 3,343 A * | 11/1843 | Littlefield | E05B 65/0864 | 292/153 |
| 152,009 A * | 6/1874 | Robinson | E05B 65/0864 | 292/175 |

(Continued)

FOREIGN PATENT DOCUMENTS

| | | | |
|---|---|---|---|
| CN | 107208431 B * | 9/2019 | E05B 15/04 |
| CN | 111155855 A * | 5/2020 | B65D 88/121 |

(Continued)

OTHER PUBLICATIONS

Unknown "American Sanitary Toilet Partition Slide Bolt Latch", https://www.partitionsandstalls.com/american-sanitary-toilet-partition-slide-bolt-latch.html, downloaded Sep. 17, 2021, 7 pages.

*Primary Examiner* — Christine M Mills
*Assistant Examiner* — Steven A Tullia
(74) *Attorney, Agent, or Firm* — MH2 TECHNOLOGY LAW GROUP LLP; Stuart I. Smith

(57) ABSTRACT

A latch mechanism for a bathroom stall door includes: a sliding latch having an engagement portion and a user contact portion, the user contact portion having a latch movement section and a door movement section; a door bracket configured to attach to a door and that restrains movement of the sliding latch relative to the door, the movement being restrained to a sliding movement; and a latch catcher configured to attach to a frame adjacent to the door, the latch catcher receiving the engagement portion of the sliding latch when the sliding latch is in a latched position. The latch movement section is configured to translate movement of the user to movement of the sliding latch between an unlatched position and the latched position, and the door movement section is configured to translate movement of the user to movement of the door between an open position and a closed position.

18 Claims, 8 Drawing Sheets

(58) Field of Classification Search
CPC ... E05C 1/004; E05C 1/00; E05C 1/02; E05C 1/04; E05C 1/08; E05B 1/0046; E05B 1/0069; E05B 1/0038; E05B 1/0053; E05B 65/0035; Y10S 292/30; Y10S 292/38; Y10S 292/63
See application file for complete search history.

(56) References Cited

U.S. PATENT DOCUMENTS

| | | | | | |
|---|---|---|---|---|---|
| 162,017 | A * | 4/1875 | Birge | E05C 1/04 | 292/152 |
| 569,724 | A * | 10/1896 | Oestmann | E05C 1/04 | 292/145 |
| 1,364,749 | A * | 1/1921 | Graybeal | E05B 17/2019 | 292/DIG. 13 |
| 1,724,116 | A * | 8/1929 | Swearengin | E05C 1/10 | 292/145 |
| 1,934,397 | A * | 11/1933 | Bales | E05C 1/10 | 220/326 |
| 2,094,547 | A * | 9/1937 | McCulloch | E05C 3/145 | 292/228 |
| 3,121,907 | A * | 2/1964 | Stebbins | E05B 1/0053 | 16/443 |
| 3,141,692 | A * | 7/1964 | Behrens | E05C 1/04 | 292/147 |
| 3,374,020 | A * | 3/1968 | Robert | E05C 1/10 | 292/148 |
| 3,480,316 | A * | 11/1969 | Westover | E05C 1/08 | 292/335 |
| 4,021,063 | A * | 5/1977 | Porter | E05C 1/04 | 292/148 |
| 4,198,082 | A * | 4/1980 | Imhoff | E05B 17/2073 | 292/147 |
| 4,226,452 | A * | 10/1980 | Hoffman | A47D 7/02 | 5/100 |
| 4,793,100 | A * | 12/1988 | Harding | E05C 1/04 | 292/145 |
| 4,817,239 | A * | 4/1989 | Campbell | E05B 1/0053 | 16/443 |
| 4,841,754 | A * | 6/1989 | Jones | E05B 1/0015 | 16/416 |
| 4,895,400 | A * | 1/1990 | Harding | E05C 1/04 | 292/145 |
| 5,150,591 | A * | 9/1992 | Norden, Jr. | E05C 19/003 | 292/DIG. 60 |
| 5,603,184 | A * | 2/1997 | Campbell | E05C 1/04 | 292/145 |
| 5,983,454 | A * | 11/1999 | Hartselle, III | E05B 1/0015 | 16/412 |
| 6,289,557 | B1 * | 9/2001 | Manson | E05B 1/0053 | 16/904 |
| 6,363,670 | B1 * | 4/2002 | Dewitt | E06B 9/02 | 49/463 |
| 6,554,327 | B1 * | 4/2003 | Riley | E05C 1/04 | 24/642 |
| 6,684,570 | B1 * | 2/2004 | Robledo | E05B 65/0035 | 292/147 |
| 8,272,169 | B2 * | 9/2012 | Mahdi | E05B 15/022 | 292/137 |
| 8,579,338 | B1 * | 11/2013 | Shah | E05C 1/04 | 292/1.5 |
| 8,720,116 | B1 * | 5/2014 | Ahmad | E05B 17/2038 | 16/431 |
| 8,899,634 | B1 * | 12/2014 | Stile | E05C 1/04 | 292/DIG. 40 |
| 9,097,038 | B1 * | 8/2015 | Cohen | E05B 65/087 | |
| 9,394,732 | B1 * | 7/2016 | Ahmad | E05B 1/0046 | |
| 10,156,085 | B2 * | 12/2018 | Standley | B21D 28/10 | |
| 10,724,277 | B2 * | 7/2020 | Baker | E05B 63/044 | |
| D945,246 | S * | 3/2022 | Michalski | D8/308 | |
| 11,408,206 | B2 * | 8/2022 | Lunday | E05B 13/101 | |
| 11,512,498 | B2 * | 11/2022 | Haagendrup | E05B 47/00 | |
| 11,965,362 | B2 * | 4/2024 | Buss | E05B 65/0035 | |
| 2002/0024223 | A1 * | 2/2002 | Bolduc | E05C 1/02 | 292/138 |
| 2003/0001395 | A1 * | 1/2003 | Barthelet | H01M 50/262 | 292/175 |
| 2007/0194576 | A1 * | 8/2007 | Esposito | E05C 1/166 | 292/143 |
| 2009/0102204 | A1 * | 4/2009 | Hilliard | E05B 65/0007 | 292/139 |
| 2009/0151408 | A1 * | 6/2009 | Petry | E05B 9/002 | 70/113 |
| 2009/0302617 | A1 * | 12/2009 | Schmid | E05B 65/10 | 292/92 |
| 2010/0206019 | A1 * | 8/2010 | Burke | E05B 65/006 | 70/162 |
| 2012/0198774 | A1 * | 8/2012 | Buck | E05B 1/0069 | 16/412 |
| 2014/0203569 | A1 * | 7/2014 | Stile | E05B 15/024 | 292/137 |
| 2015/0007623 | A1 * | 1/2015 | Alghamdi | E05C 1/04 | 292/137 |
| 2017/0145716 | A1 * | 5/2017 | Ryan | E05C 1/04 | |
| 2018/0363331 | A1 * | 12/2018 | Lynn | E05B 65/0035 | |
| 2020/0071962 | A1 * | 3/2020 | Markway | E05B 1/0046 | |
| 2021/0348423 | A1 * | 11/2021 | Brown | E05B 1/0015 | |
| 2022/0154501 | A1 * | 5/2022 | Johnson | E05F 5/06 | |
| 2022/0178180 | A1 * | 6/2022 | Magnotta | E05B 1/0053 | |
| 2022/0316236 | A1 * | 10/2022 | Watford | E05B 1/0069 | |
| 2022/0333404 | A1 * | 10/2022 | McIntire | E05B 1/0053 | |
| 2023/0349206 | A1 * | 11/2023 | Marsden | E05C 1/10 | |

FOREIGN PATENT DOCUMENTS

| | | | | |
|---|---|---|---|---|
| DE | 395013 | C * | 12/1922 | E05C 1/04 |
| DE | 4016285 | A1 * | 5/1990 | E05C 1/04 |
| DE | 29714715 | U1 * | 10/1997 | E05B 17/142 |
| FR | 573807 | A * | 11/1923 | E05C 1/04 |
| FR | 2873423 | A1 * | 1/2006 | A47K 13/105 |
| GB | 191411854 | A * | 5/1914 | E05C 1/04 |
| GB | 364731 | A * | 11/1930 | E05C 1/04 |
| GB | 2523604 | A * | 9/2015 | E05B 67/383 |
| JP | 6893719 | B1 * | 6/2021 | E05B 1/00 |
| JP | 7142412 | B2 * | 9/2022 | E05B 67/383 |
| KR | 101184217 | B1 * | 6/2010 | B65D 88/121 |
| KR | 20120000657 | A * | 6/2010 | E05C 1/02 |
| WO | WO-2013181688 | A1 * | 12/2013 | E05B 17/0045 |
| WO | WO-2017156526 | A1 * | 9/2017 | B21D 28/10 |
| WO | WO-2019012316 | A1 * | 1/2019 | E05B 41/00 |

* cited by examiner

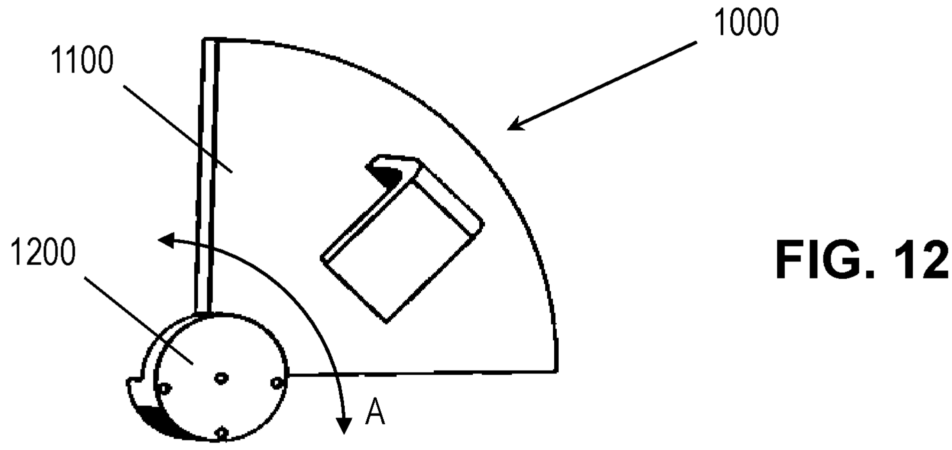
FIG. 12
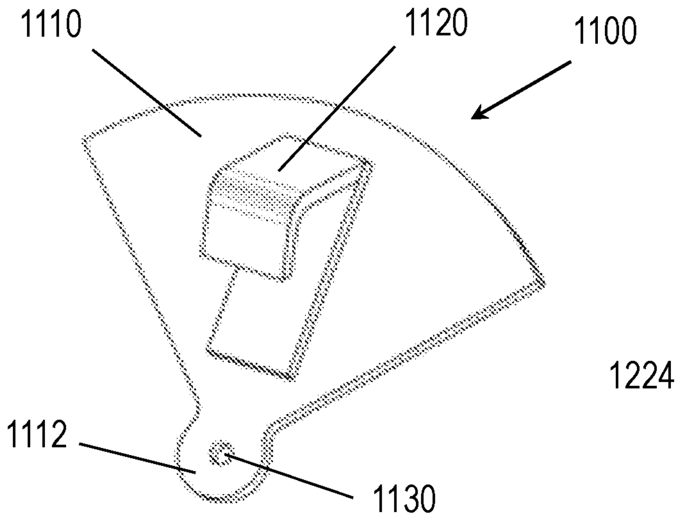
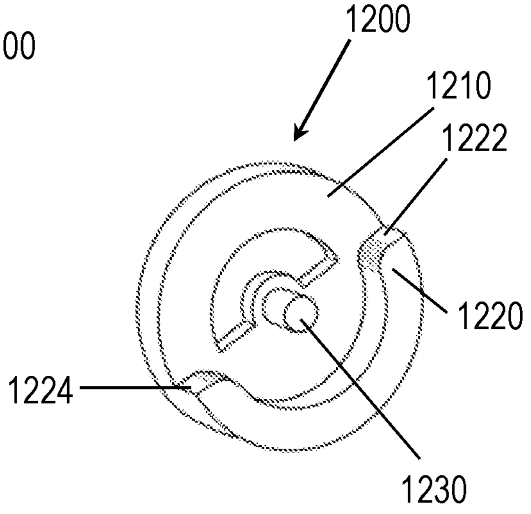
FIG. 13
FIG. 14

HANDS FREE BATHROOM STALL LATCH

PRIORITY CLAIM

The application claims the benefit of the filing date of U.S. Provisional Patent Application No. 63/121,065 filed Dec. 3, 2020, the disclosure of which is incorporated in its entirety by reference herein.

FIELD OF THE INVENTION

The invention is directed to a latch for a stall in a bathroom. More particularly, embodiments of the invention are directed to a latch for a stall in a bathroom that is operable without the user using their hands.

An example of an application for the invention is a hands free latch in a stall of a commercial bathroom, where a user of the stall can easily close and open the latch without using either of their hands.

BACKGROUND OF THE INVENTION

Many buildings, such as, for example, commercial office buildings or other commercial buildings, have bathrooms containing one or more stalls that partition a toilet from the rest of the bathroom. The stall often has a latch that the user of the stall operates to lock the stall door so that other people cannot open the door while the user is in the stall.

Latches are primarily used for the purpose of locking doors. Normal latches are locked manually from inside for the purpose of securing the door. Restricted toilet facilities like aircraft toilets and train toilets typically have normal latches installed on them. A problem arises when a person enters a toilet having a normal latch and is required to touch an unsanitary stall latch.

A conventional toilet latch needs to be manually operated by the person inside the toilet in order to secure the door. Conventional latches are manually moved from an unlocked position to a locked position when the door on which the latch is mounted, is closed.

However, even such a mechanism requires that the door is pushed from its open position towards a closed position. This movement requires user intervention to perform this action. The areas touched by the user are likely not sanitized.

Applicant recognized an improvement to the above arrangement and implements that improvement in embodiments of the invention.

SUMMARY

Many buildings, such as, for example, commercial office buildings or other commercial buildings, have bathrooms containing one or more stalls that partition a toilet from the rest of the bathroom. The stall often has a latch that the user of the stall operates to lock the stall door so that other people cannot open the door while the user is in the stall. The latch is often touched by a user of the stall after the user has used the toilet and before the user has access to a sink to wash their hands. As a result, the latch is often contaminated with fecal matter, viruses, and/or other unhealthy and/or undesirable material.

The invention achieves the benefit of allowing the user of the stall to close and open the latch without having to contact the latch with their hands. In embodiments of the invention, this benefit is achieved by configuring a handle of the latch such that the latch is operable by the user with the user's forearm. Embodiments also provide the benefit of allowing a user to easily operate the latch even if the user does not have hands or have the use of their hands.

An object of the present disclosure is to ameliorate one or more problems of the prior art or to at least provide a useful alternative. An object of the present disclosure is to provide a toilet latch assembly that is sanitary, uncomplicated, and easy and simple to use. An object of the present disclosure is to provide a toilet latch assembly which allows the user to lock the restroom stall door without utilizing their hands. An object of the present disclosure is to provide a toilet latch assembly which allows the user to close the restroom stall door without utilizing their hands. An object of the present disclosure is to provide a toilet latch assembly that is American Disability Act (ADA) compliant. An object of the present disclosure is to provide a toilet latch assembly that is easily sanitized.

The present disclosure includes embodiments of a latching assembly for locking the door of public toilets. Exemplary embodiments of the invention include: a latch configured to be installed in a universal fashion that can be installed in new or retrofit applications; a latch that can be operated utilizing the user's elbow, forearm, or other non-hand body part to move the latch between an unlocked position and a locked position; and a latch that can be operated utilizing the user's elbow, forearm, or other non-hand body part to move the door from an open position to a closed position.

Embodiments include a latch mechanism for a bathroom stall door, the latch mechanism comprising: a user operable sliding latch having an engagement portion and a user contact portion, the sliding latch being slidable between an unlatched position and a latched position, the user contact portion having a latch movement section and a door movement section; a door bracket configured to attach to a door and that restrains movement of the sliding latch relative to the door, the movement being restrained to a sliding movement; and a latch catcher configured to attach to a frame adjacent to the door, the latch catcher receiving the engagement portion of the sliding latch when the sliding latch is in the latched position. The latch movement section of the sliding latch is configured to translate movement of the user to movement of the sliding latch between the unlatched position and the latched position, and the door movement section of the sliding latch is configured to translate movement of the user to movement of the door between an open position of the door and a closed position of the door.

Embodiments include a bathroom stall door system, comprising: a door frame; a door movable relative to the door frame; and a latch mechanism. The latch mechanism comprising: a user operable sliding latch having an engagement portion and a user contact portion, the sliding latch being slidable between an unlatched position and a latched position, the user contact portion having a latch movement section and a door movement section; a door bracket attached to the door and that restrains movement of the sliding latch relative to the door, the movement being restrained to a sliding movement; and a latch catcher attached to the door frame, the latch catcher receiving the engagement portion of the sliding latch when the sliding latch is in the latched position. The latch movement section of the sliding latch is configured to translate movement of the user to movement of the sliding latch between the unlatched position and the latched position, and the door movement section of the sliding latch is configured to translate movement of the user to movement of the door between an open position of the door and a closed position of the door.

Technical advantages of embodiments of the invention include the following: providing a toilet latch assembly that is sanitary, uncomplicated, and easy and simple to use; providing a toilet latch assembly which allows the user to lock the restroom stall door without utilizing their hands; providing a toilet latch assembly which allows the user to open and close the restroom stall door without utilizing their hands; providing a toilet latch assembly that is American Disability Act (ADA) compliant; and providing a toilet latch assembly that is easily sanitized.

DRAWINGS

The attached figures form part of the present specification and are included to further demonstrate certain aspects of the disclosed features and functions, and should not be used to limit or define the disclosed features and functions. Consequently, a more complete understanding of the exemplary embodiments and further features and advantages thereof may be acquired by referring to the following description taken in conjunction with the accompanying drawings.

FIG. 1 is a perspective view of a hands free bathroom stall latch assembly according to an embodiment of the present invention in an installed state.

FIG. 2 a perspective view of the hands free bathroom stall latch assembly of FIG. 1.

FIG. 3 a front view of the hands free bathroom stall latch assembly of FIG. 1.

FIG. 4 a top view of the hands free bathroom stall latch assembly of FIG. 1.

FIG. 5 a side view of the hands free bathroom stall latch assembly of FIG. 1.

FIG. 6 a side view of the hands free bathroom stall latch assembly of FIG. 1.

FIG. 7 a perspective view of the components of the hands free bathroom stall latch assembly of FIG. 1.

FIG. 8 a perspective view of a latch catcher of the hands free bathroom stall latch of FIG. 1.

FIG. 9 a perspective view of a sliding latch of the hands free bathroom stall latch of FIG. 1.

FIG. 10 a perspective view of a bracket of the hands free bathroom stall latch of FIG. 1.

FIG. 11 a perspective view of a door stopper of the hands free bathroom stall latch of FIG. 1.

FIG. 12 is a perspective view of a hands free bathroom stall latch assembly according to an embodiment of the present invention in an installed state.

FIG. 13 a perspective view of a swinging latch of the hands free bathroom stall latch assembly of FIG. 12.

FIG. 14 a perspective view of a swivel mount of the hands free bathroom stall latch assembly of FIG. 12.

FIG. 15 a front view of the swinging latch of the hands free bathroom stall latch assembly of FIG. 12.

FIG. 16 a top view of the swinging latch of the hands free bathroom stall latch assembly of FIG. 12.

FIG. 17 a bottom view of the swinging latch of the hands free bathroom stall latch assembly of FIG. 12.

FIG. 18 a side view of the swinging latch of the hands free bathroom stall latch assembly of FIG. 12.

FIG. 19 a side view of the swinging latch of the hands free bathroom stall latch assembly of FIG. 12.

FIG. 20 a front view of the swivel mount of the hands free bathroom stall latch assembly of FIG. 12.

FIG. 21 a top view of the swivel mount of the hands free bathroom stall latch assembly of FIG. 12.

FIG. 22 a side view of the swivel mount of the hands free bathroom stall latch assembly of FIG. 12.

DETAILED DESCRIPTION

The invention is described herein with reference to the accompanying drawings in which exemplary embodiments of the invention are shown. The invention may, however, be embodied in many different forms and should not be construed as limited to the embodiments set forth herein.

As explained above, embodiments of the invention are directed to a latch for a stall in a bathroom that is operable without the user using their hands.

An object of embodiments of the invention is to reduce the transmission of germs in public restrooms by eliminating the need to use hands to open the stall door. Embodiments include a wrist pull to eliminate the need for touching the door to open or close the door. In embodiments, the wrist pull protrudes out from the sliding base or bracket so the user can insert their wrist or forearm in the space between the door and the protrusion to lock the latch and to pull the door from a closed position to an open position.

The inclusion of a small instruction sheet pasted to the stall door mitigates the risk of hands being used due to confusion. Embodiments are simple to install in existing restrooms, as the sliding latch is easy to retrofit to stall doors.

Embodiments are American with Disabilities Act (ADA) compliant and are simple to install in new and/or retrofit situations. Embodiments extend into the stall in a similar fashion to a coat hook. ADA specifications were considered to determine how far the bar could protrude into the stall. Due to the shape and angle of particular embodiments of the latch, embodiments are capable of withstanding a weight of 50 pounds hung on the latch. In embodiments, the protruding wrist pull extends no further than 3.25 inches into the stall.

An exemplary embodiment of a sliding latch assembly 10 is shown in FIGS. 1-9. In this embodiment, a sliding latch 100 slides relative to a bracket 200 that is fixed to a stall door 20. A latch catcher 300 is mounted to a stall wall 30. Also shown in FIGS. 1 and 2 is a door stopper 400 that is mounted to stall wall 30 and has an extension 420 (shown in FIGS. 7 and 11) that prevents the movement of door 20 outward past the point where door 20 and stall wall 30 are flush (the closed position of door 20). This example is for use on doors that swing inward to open. This embodiment is also applicable to doors that swing outward to open. In installations where the door swings outward to open, door stopper is mounted such that extension 420 contacts the inner face of the door when the door is closed. Ease of installation and universality are two advantages of embodiments. Embodiments are configured to be installed on doors that swing open to the right and that swing open to the left, and doors that swing open outward and swing open inward. In the embodiment shown in FIGS. 1-9, sliding latch 100 is symmetrical relative to a horizontal plane through the center of sliding latch 100 so that sliding latch 100 can be installed doors that swing open to the left and doors that swing open to the right. As shown in FIGS. 1-3, 7 and 9, the angled nature of a front section 130 of sliding latch 100 are angled on both ends. This allows for latch assembly 10 to be simply flipped over when installing on a differently swinging of the door, making it a universally installable product.

Another advantageous feature of embodiments is the height that the latch should be placed on the door. Because, in embodiments, a forearm of a user is user to operate sliding latch 100, it is advantageous for the latch to be installed higher than a normal hand operated latch. Research shows that the average female and male in the United States is about 64" and 69", respectively. Further, ADA compliance states that a coat hanger attached to the back of a stall door should be installed "54 inches above the finished floor for a side approach" (ADA Regulations, 1991). In embodiments, this and other information is used to ensure that ADA guidelines are met. For example, in embodiments, the latch is placed 54" above the floor of the stall. Other installation heights can also be used.

Due to the structure and placement of sliding latch 100, a consideration is the possibility of a person either hanging or placing a bag or other object on the latch. In embodiments, a middle section 120 of sliding latch 100 that extends into the stall is tapered to create an angled upper edge 126 (as shown in FIG. 9). Angled upper edge 126 tends to result in a bag or other object hung on sliding latch 100 sliding down and off of sliding latch 100, discouraging a user from hanging any object on sliding latch 100. In embodiments, both upper edge 126 and a lower edge of sliding latch 100 are angled similarly to allow universal use of the latch in either installation orientation (sliding to the left to open or sliding to the right to open).

FIG. 3 shows a front view of sliding latch assembly 10 as viewed from inside the bathroom stall. In this view, sliding latch 100 is in a left most position such that is engages latch catcher 300. Sliding latch 100 slides to the right in this view to move an engagement end 140 of a main section 110 of sliding latch 100 out of engagement with latch catcher 300. More specifically, an engagement surface 142 (FIGS. 4 and 9) of engagement portion 140 moves out of engagement with an engagement surface 332 (FIG. 8) of an extension 330 of latch catcher 300. In the embodiment shown, engagement end 140 and extension 330 have the same height. In other embodiments, the height of engagement end 140 and the height of extension 330 are different heights.

FIG. 4 shows a top view of sliding latch assembly 10 in the closed position and shows engagement surface 142 of sliding latch 100 engaged with engagement surface 332 of latch catcher 300. A distance D is shown from a rear surface 132 of front section 130 of sliding latch 100 to a rear surface 114 of main section 110 of sliding latch 100. Because rear surface 114 contacts, or is very close to, the mounting surface of door 20, distance D is, or is very close to, the distance between rear surface 132 and door 20. In embodiments, distance D is set to allow a wrist or forearm of a user to be positioned between rear surface 132 and rear surface 114. In embodiments, distance D is between 3 inches and 5 inches, preferably between 3.5 inches and 4.5 inches, preferably between 3.75 inches and 4.25 inches. Distance D is preferably the smallest dimension that is large enough to accept forearms of potential users. In embodiments, the angle between main section 110 and middle section 120 is between 80 degrees and 100 degrees, preferably between 85 degrees and 95 degrees, preferably 90 degrees. In embodiments, the angle between front section 130 and middle section 120 is between 80 degrees and 100 degrees, preferably between 85 degrees and 95 degrees, preferably 90 degrees. Having the angle between main section 110 and middle section 120 closer to 90 degrees tends to keep the force exerted by the user directed to closing or opening the sliding latch and to maintain the position of the user's wrist or forearm on middle section 120.

FIG. 5 shows a side view of sliding latch assembly 10 in the closed position and shows a closing surface 122 of sliding latch 100 (discussed in detail below). FIG. 6 shows a side view of sliding latch assembly 10 in the closed position and shows an opening surface 124 of sliding latch 100 (discussed in detail below). FIG. 7 shows a perspective view of sliding latch assembly 10 in an uninstalled state.

FIG. 8 shows a perspective view of latch catcher 300. In this embodiment, latch catcher 300 has a mounting section 310, middle section 320 and extension 330. Mounting section has two holes 312 that receive fasteners such as, for example, machine screws or bolts to fasted fasten latch catcher 300 to stall wall 30. Fewer or more holes 312 can be provided. As discussed above, extension 330 has an engagement surface 332 that engages engagement surface 142 of sliding latch 100. As shown in FIG. 4, a distance from engagement surface 332 to a back side of mounting section 310 is equal to (or slightly larger than) a distance from engagement surface 142 and a back side of main section 110 of sliding latch 100. Sizing the distance from engagement surface 332 to a back side of mounting section 310 only slightly larger (0.05 to 0.10 inches larger, for example) than the distance from engagement surface 142 and a back side of main section 110 of sliding latch 100 will provide easy sliding of sliding latch 100. Sizing the distance from engagement surface 332 to a back side of mounting section 310 the same as the distance from engagement surface 142 and a back side of main section 110 of sliding latch 100 will provide a tight fit of sliding latch 100 in latch catcher 300 and, as a result, a fixed position of door 20 relative to stall wall 30.

FIG. 9 shows a perspective view of sliding latch 100. In this embodiment, sliding latch 100 has main section 110, middle section 120 and front section 130. As discussed above, sliding latch 100 has an engagement end 140 at one end of main section 110. Engagement surface 142 is a surface of engagement end 140 and engages with engagement surface 332 of extension 330 of latch catcher 300. Front section 130 of sliding latch 100 has a rear surface 132 with faces door 20 when installed. A user places, for example, their wrist or forearm between front section 130 and door 20 and pulls their forearm or wrist against rear surface 132 to pull door 20 to the closed position without touching sliding latch 100 with their hands. Middle section has closing surface 122 on one side and opening surface 124 on the opposite side. The user places, for example, their wrist or forearm between front section 130 and door 20 and pushes their wrist or forearm against closing surface 122 to move sliding latch 100 to the closed position (and to engagement with latch catcher 300) without touching sliding latch 100 with their hands. To disengage sliding latch 100, the user places, for example, their wrist or forearm on opening surface 124 and pushes their wrist or forearm against opening surface 124 to move sliding latch 100 to the open position (and out of engagement with latch catcher 300) without touching sliding latch 100 with their hands. In this example, engagement end 140 has an angles surface 144 that moves sliding latch (and thus door 20) into proper alignment with latch catcher 300 in some cases where door 20 is not closed fully.

As shown in FIG. 10, bracket 200 has a first flange 210 and a second flange 220. First flange 210 has two mounting holes 212 to receive fasteners such as, for example, machine screws or bolts to fasted bracket 200 to door 20. Similarly, second flange 220 has two mounting holes 222 to receive fasteners such as, for example, machine screws or bolts to fasted bracket 200 to door 20. In this embodiment, bracket 200 has a first strap 230 and a second strap 240 which hold sliding latch 100 to door 20. As shown in FIG. 10, first strap 230 has an inner surface 232, and second strap 240 has an inner surface 242. Inner surfaces 232, 242 contact a surface 112 of main section 110 of sliding latch 100 (FIGS. 1 and 2). In embodiments, the height of inner surfaces 232, 242 of bracket 200 match the height of main section 110 of sliding latch 100. In embodiments, inner surfaces 232, 242 of bracket 200 are slightly larger than the height of main section 110 of sliding latch 100 to allow main section 110 to slide relative to bracket 200.

FIG. 11 shows a perspective view of door stopper 400. In this example, door stopper 400 has a main section 410, two mounting sections 430, 440 extending from main section 410, and a door stop section 420 extending in a direction opposite to that of mounting sections 430, 440. In this example, mounting section 430 has two holes 432, and mounting section 440 has two holes 442, for receiving receive fasteners such as, for example, machine screws or bolts to fasted door stopper 400 to stall wall 30. In embodiments, door stopper 400 is configured to help prevent door 20 from swinging beyond the correct closed position when the user closes door 20. In embodiments, the door stopper wraps around stall wall 30 (or pilaster) to which the door is latched. As stall walls/pilasters come in various sizes of thickness, the width of the opening in door stopper 400 is configured to fit the size of the particular stall wall/pilaster being used.

Embodiments of the invention are manufactured from a material that is able to function in a wide variety of temperatures and environments. Embodiments of the invention use aluminum 6061 (a heat-treated aluminum alloy consisting of magnesium and silicon). This alloy of aluminum has a high corrosion resistance, meaning it can exist in any temperament, and is relatively inexpensive. Further, research shows that germs reside on aluminum for four hours while they can live on stainless steel for 72 hours. Although an object of the invention is to reduce the transmission of germs by providing a hands-free solution, it can be beneficial to use a material that supports germ life for a relatively shorter period of time. Other non-limiting examples of suitable materials include zinc alloys such as, for example, Zamak, and stainless steel.

With the described shape of sliding latch 100, it is likely that some users will attempt to hang a heavy object, such as a book bag, on front section 130 and/or middle section 120 of sliding latch 100. In embodiments, sliding latch 100 is 0.25 inches thick and is mounted to door 20 with bracket 200 which has a total tolerance of 2 mm in the vertical direction. Despite the countermeasure of tapered middle section 120 and front section 130 to promote the sliding off of any item and prevent the users from hanging bags or heavy items that might adversely affect the product, there still exists a risk that this measure does not work. To help ensure that sliding latch assembly 10 will not undergo failure with a downward force acting on the top surface of sliding latch 100, a sufficiently strong structure is provided. For example, embodiments support a weight of 50 pounds.

In embodiments, sliding latch 100, bracket 200, and latch catcher 300 all have a fillet of 0.05 in along the edges to help reduce risk to the user. Door stopper 400 utilizes a filler of 0.025 due to size constraints, and because it is unlikely that users will have any contact with it. In embodiments, a tolerance of +/−0.025 inches was applied to each piece to ensure the parts properly function with each other.

While the above embodiments were described with sliding latch 100 attached to door 20 and latch catcher 300 attached to stall wall 30, it is noted that other embodiments include sliding latch 100 attached to stall wall 30 and latch catcher 300 attached to door 20.

An alternate embodiment shown in FIGS. 12-22 utilizes a quarter circle shape that is pivoted in and out of the locked position by the user's wrist, forearm, of elbow. In embodiments, the examples shown in FIGS. 12-22 are used in conjunction with latch catcher 300 and door stopper 400 where latch catcher 300 and door stopper 400 serve the same roles as with the embodiments shown in FIGS. 1-7. FIG. 12 is a perspective view of a pivoting latch assembly 1000 having a pivoting latch 1100 and a mounting member 1200. In this embodiment, mounting member 1200 is fixed to a stall door such that pivoting latch 1100 pivots along the path of Arrow A from an open position to a closed position. In the open position, pivoting latch 1100 does not contact the stall wall and does not prevent the door from opening relative to the stall wall. In the closed position, pivoting latch 1100 contacts the stall wall and prevents the door from opening relative to the stall wall.

FIG. 13 shows that, in this embodiment, pivoting latch 1100 has a main body 1110, and a handle 1120 that is configured to be contacted by, for example, a user's wrist, forearm, or elbow to move pivoting latch 1100 between the open position and the closed position. Two different configurations of handle 1120 are shown in FIGS. 12 and 13. At an end of main body 1110, an attachment section 1112 is provide with a hole 1130.

FIG. 14 shows a perspective view of mounting member 1200. Mounting member is fixed to the door with adhesive, machine screws, bolts, or other fasteners. In this example, mounting member 1200 has a main body 1210 from which a pin 1230 extends. Pin 1230 is received in hole 1130 to pivotably attach pivoting latch 1100 to mounting member 1200. Mounting member 1200 has a protrusion 1220 which forms two stops 1222, 1224 that limit the extent to which pivoting latch 1100 pivots relative to mounting member 1200.

Figure 1:
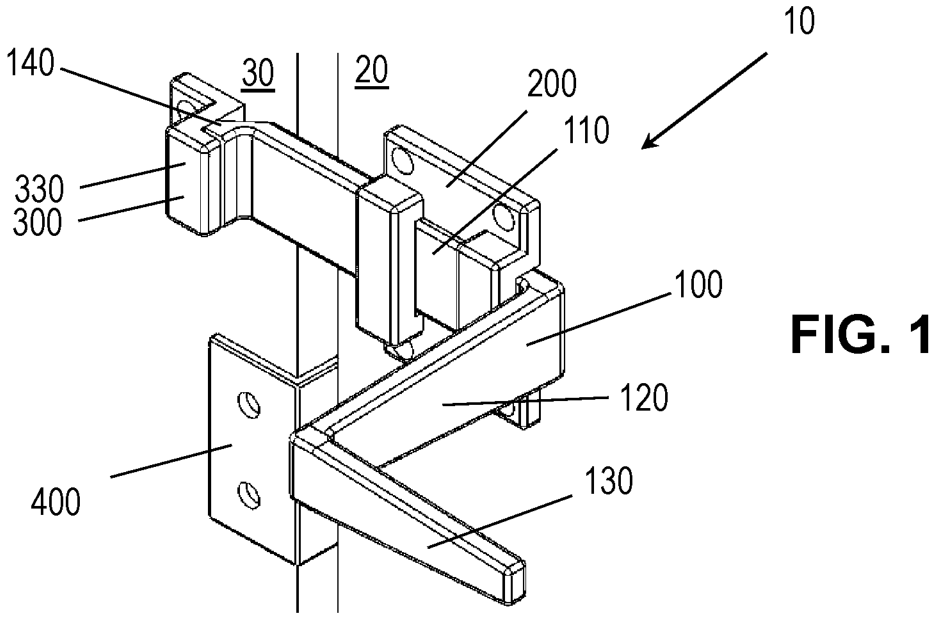
Figure 2:
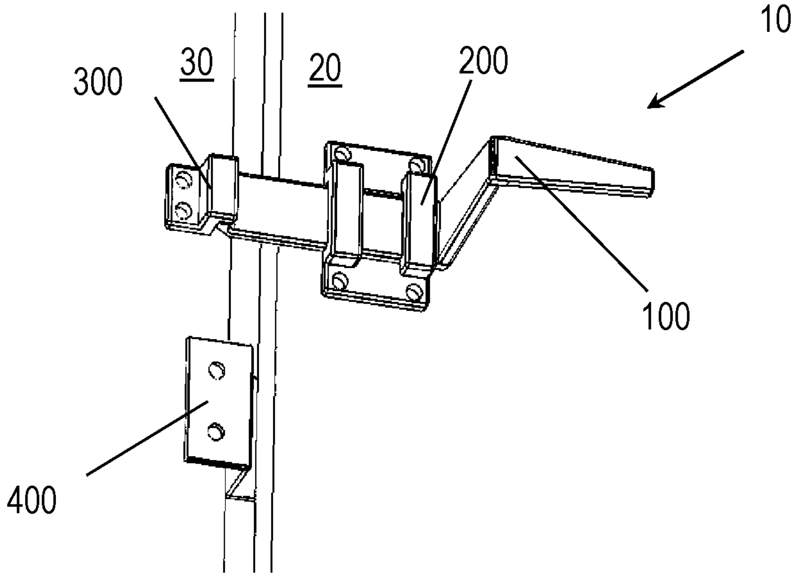
Figure 3:
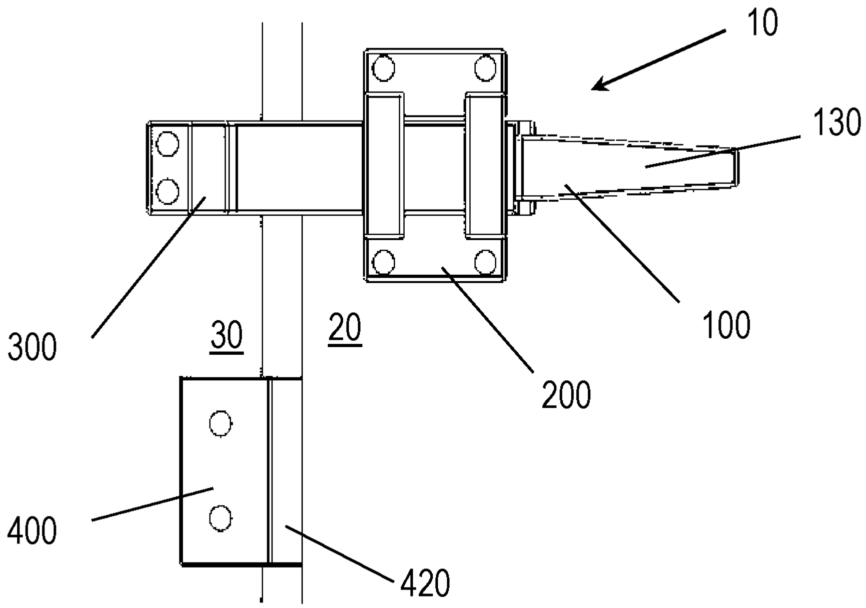
Figure 4:
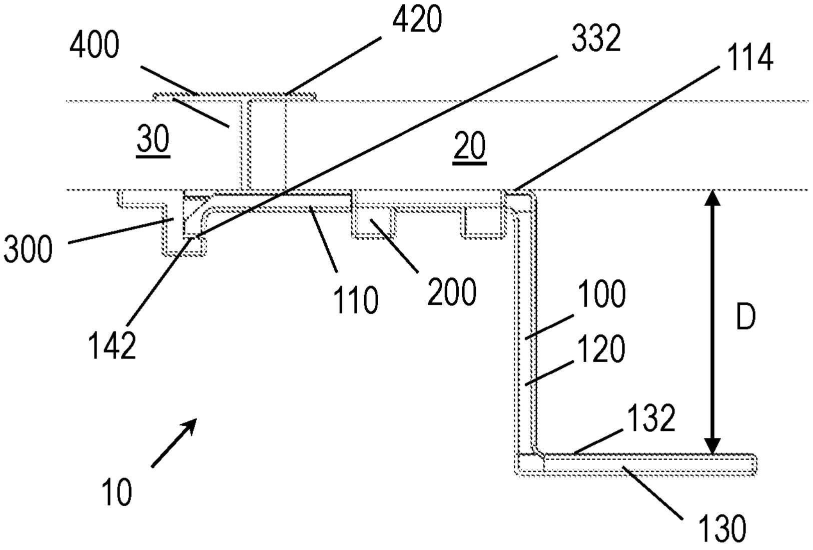
Figure 5:
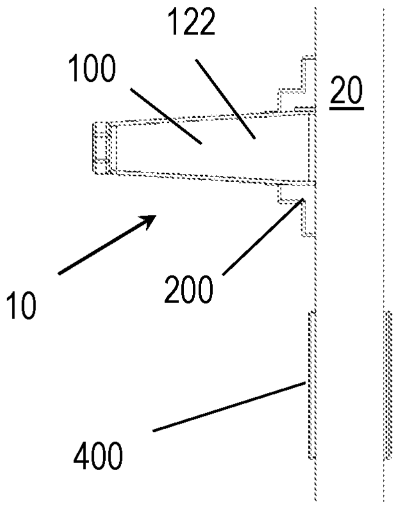
Figure 6:
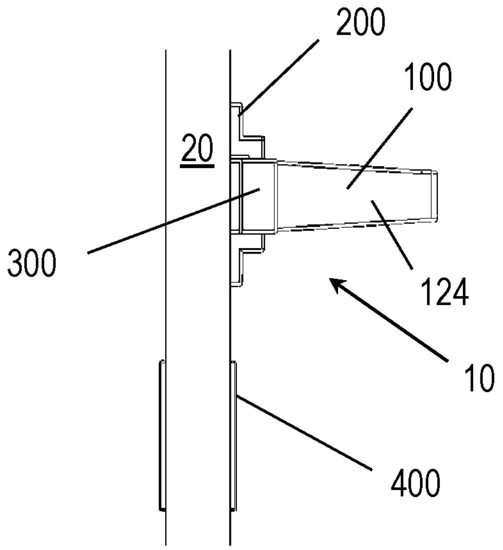
Figure 7:
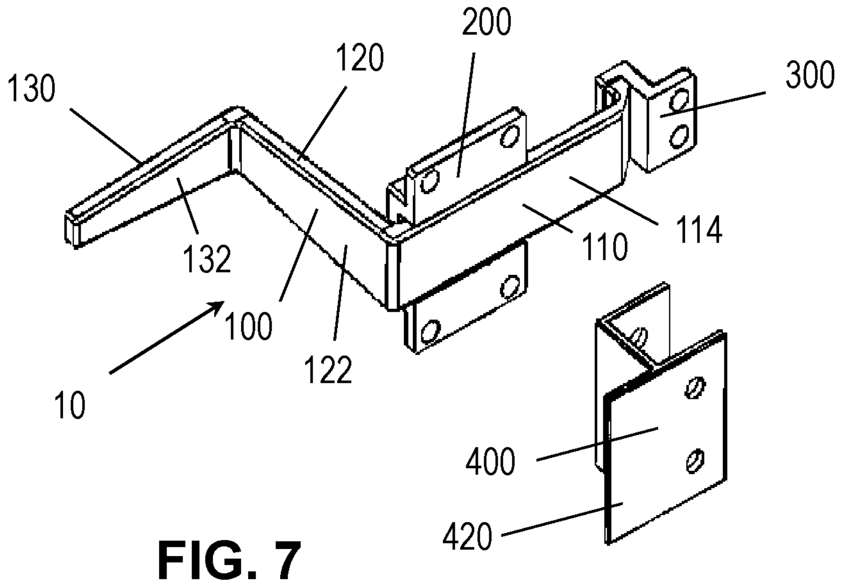
Figure 8:
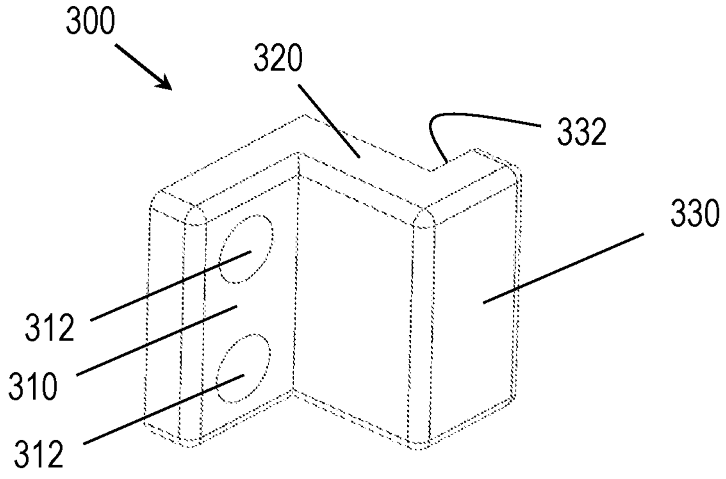
Figure 9:
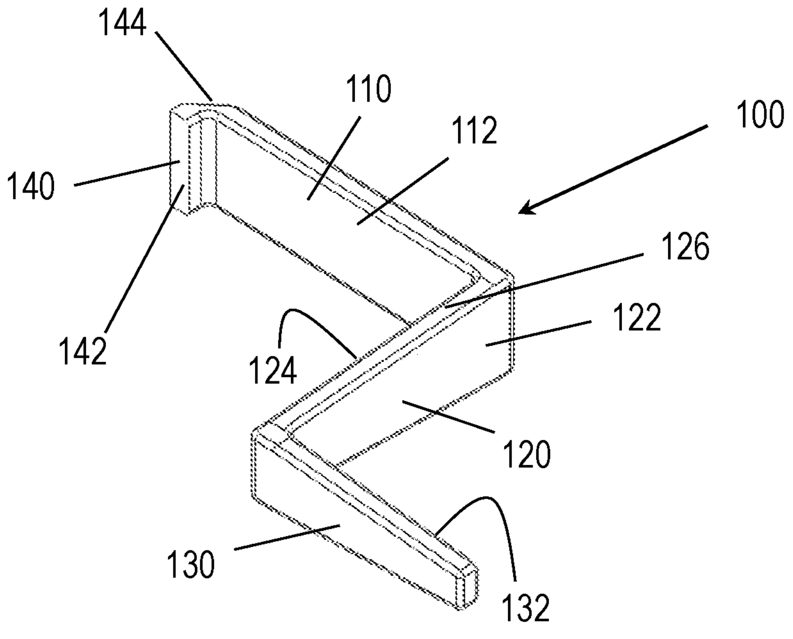
Figure 10:
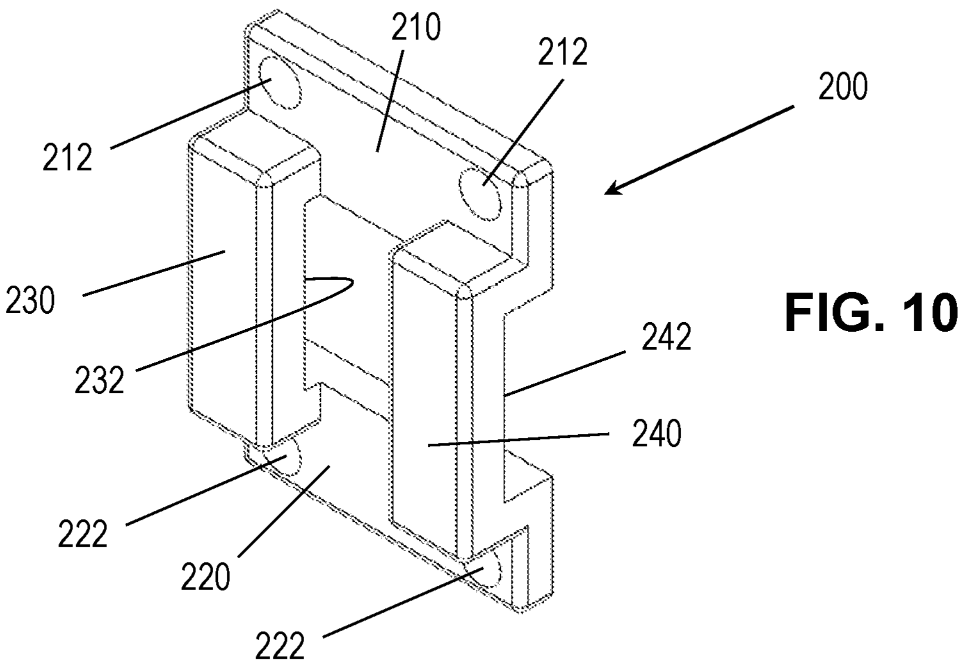
Figure 11:
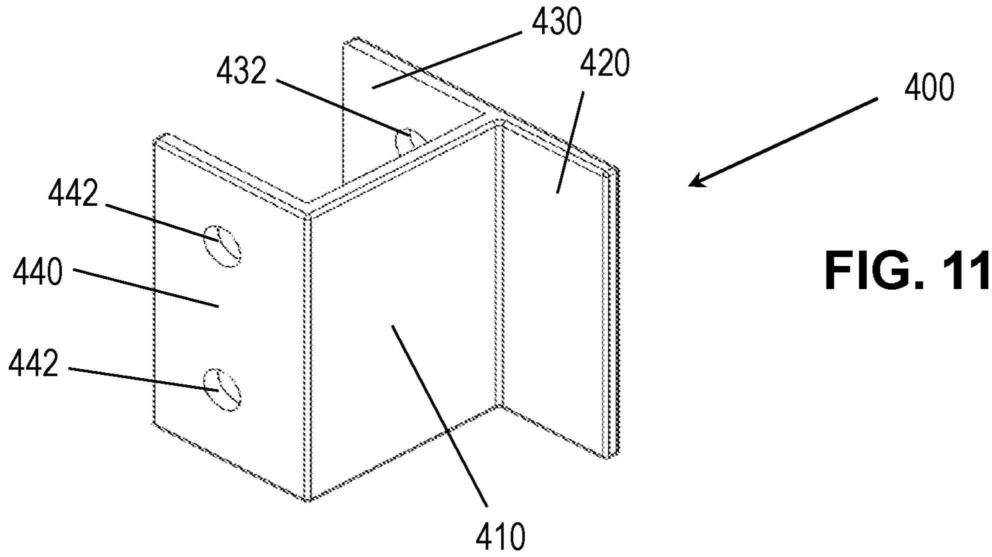
Figure 16:
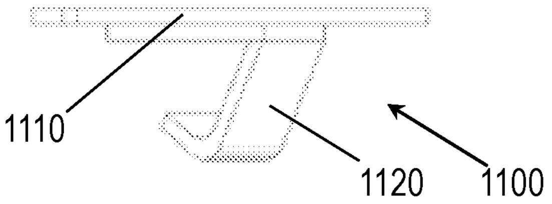
FIG. 16 is a top view of pivoting latch 1100.
Figure 18:
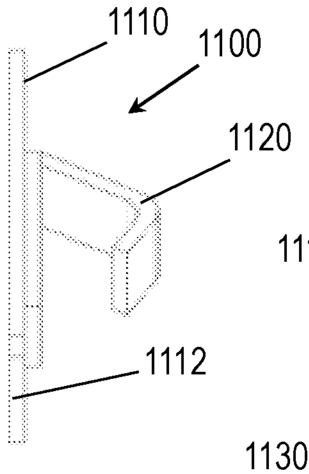
FIGS. 18 and 19 are side views of pivoting latch 1100.
Figure 15:
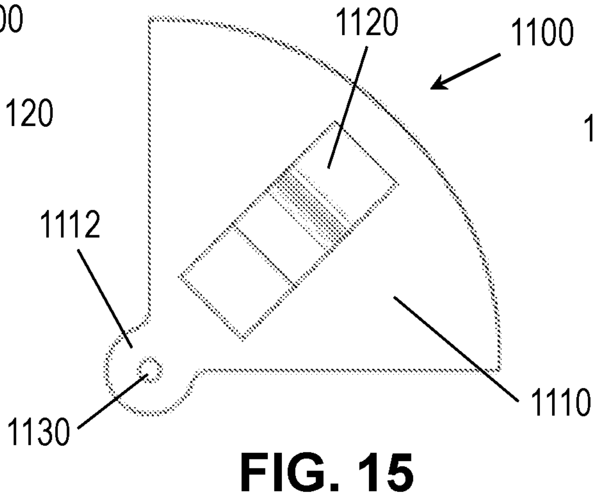
FIG. 15 is a front view of pivoting latch 1100.
Figure 19:
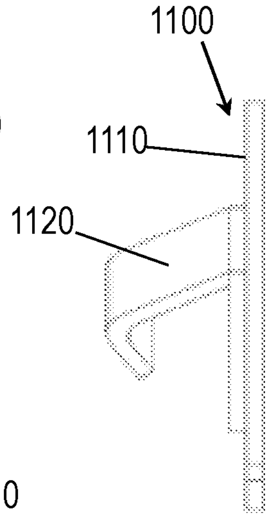
Figure 17:
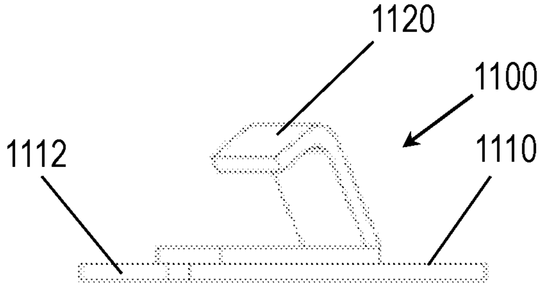
FIG. 17 is a bottom view of pivoting latch 1100.
Figure 21:
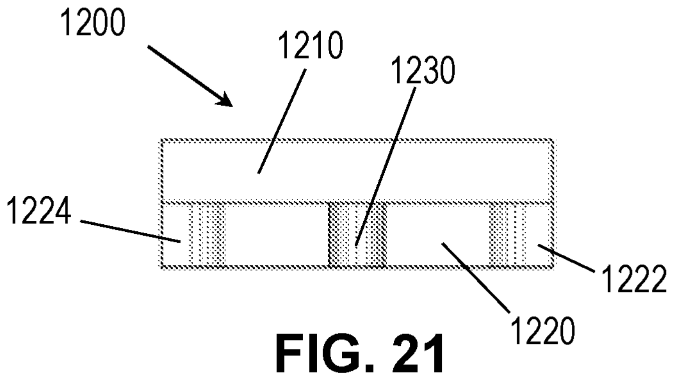
FIG. 21 is a top view of mounting member 1200.
Figure 22:
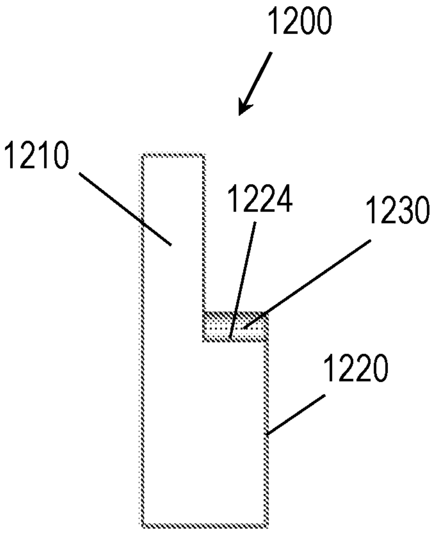
FIG. 22 is a side view of mounting member 1200.
Figure 20:
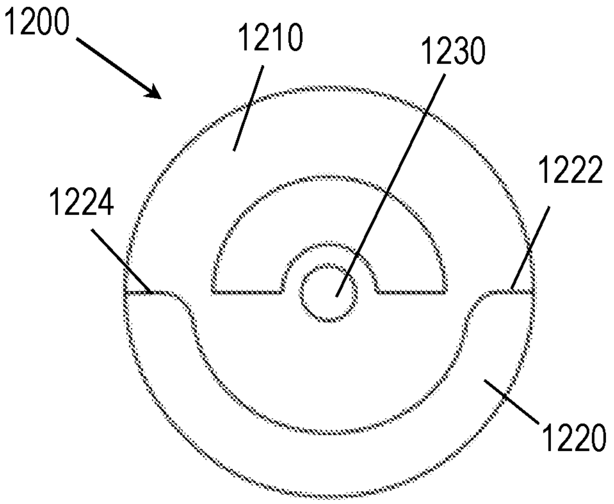
FIG. 20 is a front view of mounting member 1200.

While the above embodiments were described with pivoting latch 1100 and mounting member 1200 attached to the door and latch catcher 300 and door stopper 400 attached to the stall wall, it is noted that other embodiments include pivoting latch 1100 and mounting member 1200 attached to the stall wall and latch catcher 300 and door stopper 400 attached to the door.

It will be appreciated that variants of the above-disclosed and other features and functions, or alternatives thereof, may be combined into many other different systems or applications. Any of the features described above can be combined with any other feature described above as long as the combined features are not mutually exclusive. Various presently unforeseen or unanticipated alternatives, modifications, variations or improvements therein may be subsequently made by those skilled in the art which are also intended to be encompassed by the invention.

What is claimed is:

1. A latch mechanism for a bathroom stall door, the latch mechanism comprising:

a user operable sliding latch having an engagement portion and a user contact portion, the sliding latch being slidable between an unlatched position and a latched position, the user contact portion having a latch movement section and a door movement section;

a door bracket configured to attach to a door and that restrains movement of the sliding latch relative to the door, the movement being restrained to a sliding movement; and a latch catcher configured to attach to a frame adjacent to the door, the latch catcher receiving the engagement portion of the sliding latch when the sliding latch is in the latched position, wherein the latch movement section of the sliding latch is configured to translate movement of the user to movement of the sliding latch between the unlatched position and the latched position, the door movement section of the sliding latch is configured to translate movement of the user to movement of the door between an open position of the door and a closed position of the door, the sliding latch has a main section that has the engagement portion at a first end of the main section, the latch movement section extends from a second end of the main section at a non-zero angle, the second end being opposite the first end, the door movement section extends from the latch movement section at a non-zero angle, the main section extends from the latch movement section in a first direction, the door movement section is configured to receive a forearm of the user by extending from the latch movement section in a second direction, the second direction is opposite the first direction, the main section of the sliding latch is planar, the latch movement section is planar, the door movement section is planar, the latch movement section has a first end adjacent to the door movement section and a second end opposite to the first end, and the latch movement section is tapered such that the first end has a smaller cross-section than the second end, the door movement section has a first end adjacent to the latch movement section and a second end opposite to the first end, and the door movement section is tapered such that the second end has a smaller cross-sectional area than the first end, the second end of the door movement section is a free end such that nothing is attached to the second end of the door movement section, and the cross-sectional area of the door movement section at the second end of the door movement section is smaller than a cross-sectional area of every other portion of the door movement section.

2. The mechanism of claim 1, wherein the main section of the sliding latch has a rear surface, the door movement section has a rear surface that is adjacent to the latch movement section, and a distance from the rear surface of the main section to the rear surface of the door movement section is between 3 inches and 5 inches.

3. The mechanism of claim 2, wherein the distance from the rear surface of the main section to the rear surface of the door movement section is between 3.5 inches and 4.5 inches.

4. The mechanism of claim 2, wherein the rear surface of the main section is parallel to the rear surface of the door movement section.

5. The mechanism of claim 1, wherein the main section of the sliding latch has a rear surface, the door movement section has a rear surface that is adjacent to the latch movement section, and the rear surface of the main section is parallel to the rear surface of the door movement section.

6. The mechanism of claim 5, wherein the latch movement section extends from the main section at an angle between 80 degrees and 100 degrees.

7. The mechanism of claim 1, wherein the latch movement section extends from the main section at an angle between 80 degrees and 100 degrees.

8. The mechanism of claim 1, wherein the door movement section is configured to extend beyond the latch movement section such that no portion of the latch mechanism exists in a space directly between the door movement section and the door.

9. The mechanism of claim 1, wherein the engagement portion extends at a 90 degree angle from the main section and is configured to extend at a 90 degree angle away from a surface of the frame.

10. A bathroom stall door system, comprising:

a door frame;

a door movable relative to the door frame; and a latch mechanism, comprising:

a user operable sliding latch having an engagement portion and a user contact portion, the sliding latch being slidable between an unlatched position and a latched position, the user contact portion having a latch movement section and a door movement section;

a door bracket attached to the door and that restrains movement of the sliding latch relative to the door, the movement being restrained to a sliding movement; and a latch catcher attached to the door frame, the latch catcher receiving the engagement portion of the sliding latch when the sliding latch is in the latched position, wherein the latch movement section of the sliding latch is configured to translate movement of the user to movement of the sliding latch between the unlatched position and the latched position, the door movement section of the sliding latch is configured to translate movement of the user to movement of the door between an open position of the door and a closed position of the door, the sliding latch has a main section that has the engagement portion at a first end of the main section, the latch movement section extends from a second end of the main section at a non-zero angle, the second end being opposite the first end, the door movement section from the latch movement section at a non-zero angle, the main section extends from the latch movement section in a first direction, the door movement section is configured to receive a forearm of the user by extending from the latch movement section in a second direction, the second direction is opposite the first direction, the main section of the sliding latch is planar, the latch movement section is planar, the door movement section is planar, the latch movement section has a first end adjacent to the door movement section and a second end opposite to the first end, and the latch movement section is tapered such that the first end has a smaller cross-section than the second end, the door movement section has a first end adjacent to the latch movement section and a second end opposite to the first end, and the door movement section is tapered such that the second end has a smaller cross-sectional area than the first end, the second end of the door movement section is a free end such that nothing is attached to the second end of the door movement section, and the cross-sectional area of the door movement section at the second end of the door movement section is smaller than a cross-sectional area of every other portion of the door movement section.

11. The system of claim 10, wherein the main section of the sliding latch has a rear surface, the door movement section has a rear surface that is adjacent to the latch movement section, and a distance from the rear surface of the main section to the rear surface of the door movement section is between 3 inches and 5 inches.

12. The system of claim 11, wherein the distance from the rear surface of the main section to the rear surface of the door movement section is between 2.5 inches and 4.5 inches.

13. The system of claim 11, wherein the rear surface of the main section is parallel to the rear surface of the door movement section.

14. The system of claim 10, wherein the main section of the sliding latch has a rear surface, the door movement section has a rear surface that is adjacent to the latch movement section, and the rear surface of the main section is parallel to the rear surface of the door movement section.

15. The system of claim 14, wherein the latch movement section extends from the main section at an angle between 80 degrees and 100 degrees.

16. The system of claim 10, wherein the latch movement section extends from the main section at an angle between 80 degrees and 100 degrees.

17. The system of claim 10, wherein no portion of the system exists in a space directly between the door movement section and the door.

18. The mechanism of claim 10, wherein the engagement portion extends in an extension direction that is at a 90 degree angle from the main section and extends in the extension direction away from a surface of the door frame, the engagement portion comprises an engagement surface at an end of the engagement portion, and the engagement surface is planar and is perpendicular to the extension direction.

* * * * *